United States Patent [19]
Colby

[11] Patent Number: 5,470,468
[45] Date of Patent: Nov. 28, 1995

[54] SPIRAL FILTRATION MODULE HAVING BYPASS PREVENTION FLANGE

[75] Inventor: David M. Colby, Medford, Mass.

[73] Assignee: Koch Membrane Systems, Inc., Wilmington, Mass.

[21] Appl. No.: 134,062

[22] Filed: Oct. 12, 1993

[51] Int. Cl.$^6$ ................................................ B01D 27/08
[52] U.S. Cl. ........................ 210/321.6; 210/435; 210/450
[58] Field of Search ........................... D23/269; 277/135;
285/335, 910; 210/321.82, 321.83, 321.84,
321.86, 321.87, 435, 450, 321.6; 55/502;
96/101, 106, 107

[56] References Cited

U.S. PATENT DOCUMENTS 4,301,013  11/1981  Setti et al. .
4,966,699  10/1990  Sasaki et al. ........................... 210/450
4,988,445   1/1991  Fulk, Jr. .
5,128,037   7/1992  Pearl et al. ............................. 210/450
5,192,437   3/1993  Chang et al. .

Primary Examiner—Robert A. Dawson
Assistant Examiner—W. L. Walker
Attorney, Agent, or Firm—Shook, Hardy & Bacon

[57] ABSTRACT

A membrane filtration module is provided incorporating a seal assembly to seal the annular space or bypass channel existing between the outer diameter of the filtration cartridge and the inner diameter of the housing in which it is disposed. The seal assembly prevents a feed stream from entering the bypass channel, and includes a pair of seals each having a flexible gasket and a sleeve extending perpendicularly therefrom, the sleeve being adapted to be positioned directly on the cartridge. This positioning prevents the feed stream from ever coming into contact with the housing.

6 Claims, 1 Drawing Sheet

U.S. Patent          Nov. 28, 1995          5,470,468
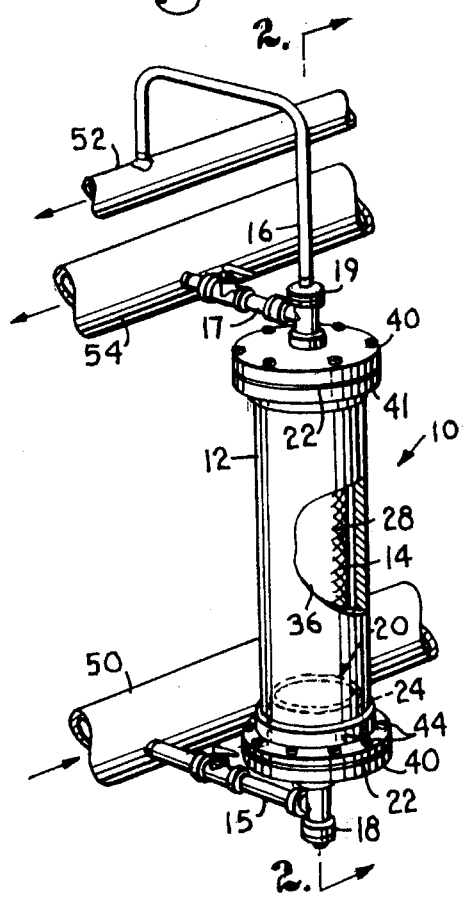
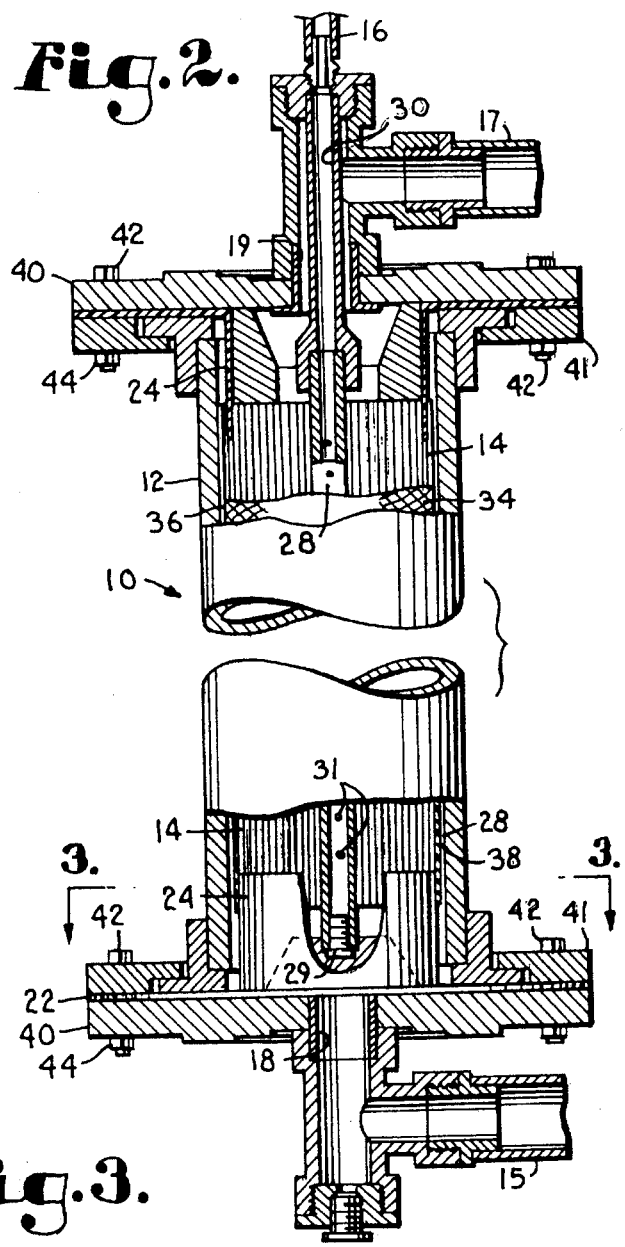
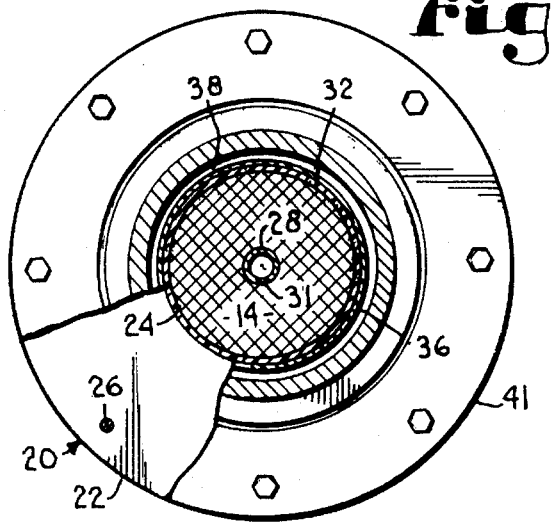
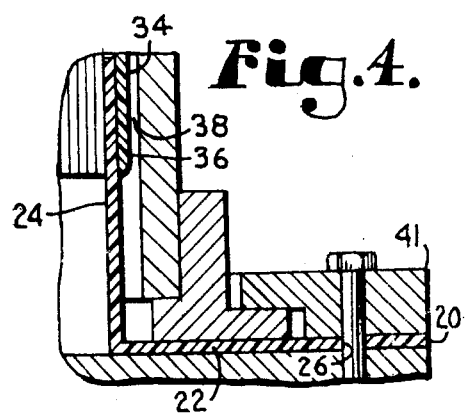

SPIRAL FILTRATION MODULE HAVING BYPASS PREVENTION FLANGE

BACKGROUND OF THE INVENTION

This invention relates in general to the field of membrane filtration and, more particularly, to an improved device for preventing the bypass of feed flow from the membrane filtration module.

Semipermeable membranes are utilized in both high pressure reverse osmosis and low pressure membrane filtration such as ultrafiltration and microfiltration processes. A typical filtration cartridge within an membrane filtration module includes membranes wound spirally around permeate tubes to form the cartridge. A number of like cartridges can be combined inside of a cylindrical housing, and are typically utilized in series or parallel combinations for filtration of a wide variety of food, pharmaceutical, electrodeposition paint, and industrial waste products.

In applications such as food and pharmaceutical processing, it is essential that the filtration system be thoroughly cleaned after processing the food or pharmaceutical materials. Continual cleaning can also be accomplished during processing by applying an overwrap of plastic netting to the outer diameter of the spiral membrane cartridge to keep the filtering membrane spaced away from its associated housing, and utilizing "controlled bypass" of a small amount of a feed stream along the annular space between the inside wall of the housing and the outer diameter of the filtering membrane cartridge, which space is sometimes referred to as the bypass zone or bypass channel. The flow of fluid within this annular space continually washes away and precludes buildup of material between the cartridge and the housing thereby achieving the goal of thorough cleaning of the bypass zone. The disadvantage of the controlled bypass design is that in most cases a substantial proportion of the feed flow will bypass the filtration membrane, resulting in wasted pump energy and reduced operating efficiency. This occurs because of the practical difficulty in controlling the dimensions of the outer diameter of the cartridge and the inner diameter of the housing to the extent necessary to prevent a loose cartridge fit and preferential feed flow through the resultant gap.

Alternatively, it is sometimes desirable to eliminate the feed flow bypass, as in situations where the fluid being processed tends to accumulate or become lodged in the annulus between the cartridge and the housing. One example of such a situation is the electrodeposition of paint, whereby a paint and water feed must be filtered. It is critical in this application that the paint not stagnate anywhere in the assembly, as it tends to solidify and plug the filtering cartridge, even solidifying the cartridge within the housing, making difficult or even impossible the future removal of the cartridge for cleaning or replacement purposes.

Elimination of this feed flow bypass problem involves sealing the small space or annulus between the outer diameter of the cartridge and the inner diameter of the housing. There are several methods currently available in the industry to seal this space and thereby prevent the bypass problem. One design employs O-ring seals and associated O-ring holders on the opposed ends of the cartridge as an inexpensive, relatively simplistic approach to generating a seal. This technique, however, has several disadvantages. A tight housing tolerance is required, as well as smooth seal surfaces, both of which result in increased housing costs. Also, a large amount of force is required for insertion of large diameter O-rings around the cartridge. Further, the O-ring can sustain damage or even dislodge as the cartridge is positioned within the housing.

The dislodging of or damage to the O-ring, as well as the difficulties encountered in inserting the O-rings, may be circumvented by utilizing the O-ring as a gasket seal. This method, however, is more complicated and therefore more costly, requiring both a large diameter O-ring and an associated compression plate to apply an external force to the O-ring. These two elements result in excessive blockage of the spiral feed channel, which in turn creates an additional pressure drop and decreased filtering performance. The constant compression associated with this compression seal design places the cartridge under constant stress which may result in failure of the spiral module. Further, the compression seal design requires tight dimensional control in an axial direction, resulting in higher cartridge and housing costs.

Another conventional bypass method employs a brine seal and an associated brine seal holder, with the seal installed at one end or both ends of the housing. This design is slightly more expensive than the O-ring design as custom designed seals and molded plastic seal holders are typically required, although it is a desirable bypass method in situations where housing tolerances are too great for O-ring seals to be effectively utilized. Specific installation methods are required for brine seals so as to prevent accidental reverse installation which would render the seals useless. One disadvantage to this design is that the brine seals do not prevent all of the feed flow from leaking through the contact point between the seal and the wall. When the feed stream leaks past the brine seals and into the bypass channel between the cartridge and the inside diameter of the housing, resulting sanitation (e.g., for milk or food processing) and/or cartridge removal (e.g., for electrocoat paint processing) problems tend to occur because of the relatively stagnant flow in this long annular space.

A third conventional bypass method in the industry consists of using a brine seal without an associated holding device. In this method, an elastomeric seal is positioned at one end of the spiral membrane cartridge without the use of a seal holder and is utilized to seal the annular bypass channel. Feed pressure acts to flare open a relatively thin, flexible appendage of the seal forcing it against the housing wall, thereby generating the desired sealing effect. The flexibility and method of operation of this type of seal dictate that these seals only be installed on one end of the cartridge. While brine seals are effective in limiting the bypass flow, the bypass channel behind the seal tends to fill with concentrate resulting in the same sanitation and cartridge removal problems associated with brine seals with holding devices as discussed above. Brine seals without associated holding devices have several other disadvantages, including the loss in productivity which results because the seals are attached to the outside diameter of the spiral rather than to the end of the spiral, severely limiting the membrane area available for processing the fluid. Additionally, if the cartridge is mistakenly installed backwards, the result will be serious bypass which would result in severe membrane performance problems and loss of energy efficiency of the cartridge. Another of the disadvantages of the brine seal is that a housing containing a cartridge utilizing this seal must be mounted in a vertical orientation, as horizontal mounting would automatically result in collapsing the seal under the weight of the cartridge on one side and opening the bypass channel on the opposite side beyond the seal's expansion limits. This eliminates the ability to run modules in series as the height of a vertically oriented system would quickly become a problem. Building parallel instead of in-series configurations to employ brine seal cartridges would greatly increase the system cost, as more valves, fittings, piping and labor would be required. A further disadvantage of the brine seal is that the cartridge using this type of seal cannot be operated in a reverse flow.

A fourth bypass prevention design is polymer potting, a method in which the cartridge is first wrapped in tape, and a liquid material (typically thermoset resin such as epoxy) is then injected or poured into a portion of or the entire annulus between the cartridge and the housing. The liquid material is then allowed to harden and completely seal the bypass channel. While this technique of bypass prevention is very effective, its major limitation is that the cartridge becomes bonded to the housing. As a result, the housing must always be replaced when replacing the cartridge.

SUMMARY OF THE INVENTION

It is therefore an object of this invention to provide a spiral filtration cartridge having a bypass prevention device which extends continuously from the end caps of the membrane filtration module to the cartridge so that feed flow bypass is eliminated and neither sanitation nor cartridge removal problems occur.

It is another object of this invention to provide a spiral filtration cartridge having a bypass prevention device which is attached to the outside diameter of the cartridge whereby the feed flow is never exposed to the housing wall so that there can be no blockage or buildup of feed flow in the cartridge feed channel.

It is a further object of the present invention to provide a spiral filtration cartridge having a bypass prevention device which is able to be inserted into the housing with negligible force so that the tendency for seal damage during installation is substantially eliminated.

It is yet another object of the present invention to provide a spiral filtration cartridge having a bypass prevention device capable of operating in both forward or reverse flow without concern for the integrity of the seal and without need for a seal holder.

It is a still further object of the present invention to provide a spiral filtration cartridge having a bypass prevention device which directly attaches to the cartridge (without need for a seal holder) and which is symmetrically designed, so that the potential for improper installation is eliminated.

Still another object of the present invention is to provide a spiral filtration cartridge having a bypass prevention device which does not require potting, so that the cartridge can be easily replaced without additionally replacing the housing unit.

It is yet a further object of the present invention to provide a spiral filtration cartridge having a bypass prevention device with no moving appendages so that the housing employing such a cartridge can be installed either vertically or horizontally without affecting the seal integrity.

It is yet another object of the present invention to provide a spiral filtration cartridge having a bypass prevention device which attaches directly to the filtration cartridge and which does not achieve its seal by contacting the inner wall of the housing, so that effective bypass prevention can be achieved even in situations having relatively high housing tolerances between the cartridge and the associated housing.

To accomplish these and other related objects of the invention, a filtration device is provided which includes a housing for receiving a feed stream therein, a spiral filtration cartridge, and a seal assembly for sealing the annular space between the inner diameter of the housing and the outer diameter of the filtration cartridge. The seal assembly prevents the bypass of feed stream into the annular space and comprises a gasket and a sleeve extending perpendicularly therefrom. The seal is designed to be positioned directly onto the opposed ends of the cartridge so that the feed stream never contacts the inner walls of the housing. The inner diameter of the sleeve is slightly smaller than the outer diameter of the cartridge, wherein the seal can be securely retained in position on the cartridge by compression. The seal is typically constructed of a flexible material, allowing a filtration cartridge having a seal positioned thereon to be placed within a housing using negligible force.

BRIEF DESCRIPTION OF THE DRAWINGS

In the accompanying drawings which form a part of the specification and are to be read in conjunction therewith and in which like reference numerals are used to indicate like parts in the various views:

FIG. 1 is a perspective view of an membrane filtration module incorporating a bypass seal of the present invention, with portions of the housing broken away for purposes of illustration;

FIG. 2 is a fragmentary side elevation view of the membrane filtration module taken in vertical cross-section along line 2—2 of FIG. 1 in the direction of the arrows, with portions of the filtration housing and cartridge being broken away for purposes of illustration;

FIG. 3 is an end elevation view of the membrane filtration module taken in horizontal cross-section along line 3—3 of FIG. 2 in the direction of the arrows, with portions of the housing flange being broken away for purposes of illustration; and FIG. 4 is an enlarged fragmentary view of the bypass seal of the present invention incorporated onto the membrane filtration module.

DESCRIPTION OF THE PREFERRED EMBODIMENT

Turning now to the drawings in greater detail, and initially to FIGS. 1 and 2, a filtration module, generally designated by the numeral 10, comprises an external housing 12 and a filtration cartridge 14 positioned within the housing 12. The housing 12 is coupled with a feed stream supply line 15 at one end and a permeate discharge line 16 and a concentrate discharge line 17 at the other end.

While only a single filtration module 10 is depicted, it is understood that multiple modules 10 can be placed end-to-end or otherwise utilized in series within a single multi-element housing. Housing 12 is typically an elongated cylinder but can be of other configurations if desired. The housing 12 includes an inlet 18 which is connected to feed stream supply line 15 and allows a feed stream to be introduced into the interior volume of the housing 12. An outlet 19 is provided at an opposite end of the housing and permits removal of both the permeate and concentrate from the housing 12.

In accordance with the present invention, bypass seals 20 are provided within the housing 12 to generate a seal between the housing 12 and the filtration cartridge 14. As can best be seen in FIGS. 2 and 3, each bypass seal 20 comprises a flange gasket 22 and a sleeve 24 extending perpendicularly therefrom. Apertures 26 for mounting bolts are provided in the flange 22. Preferably, the bypass seals 20 are constructed of a flexible material which is compatible with the fluids encountered in module 10 and is capable of forming a fluid-tight seal. In one embodiment, the seals 20 are constructed of a suitable rubber material.

Cartridge 14 is also typically an elongated cylinder and includes a permeate tube 28 positioned along the center longitudinal axis of the cartridge 14. The permeate tube 28 is closed at the inlet end of the housing 12 by a plug 29 and is connected at the opposite end to a flow line 30 which connects to the permeate discharge line 16. A plurality of openings 31 are positioned along the tube 28 to allow permeate to enter the tube 28. As can best be seen in FIG. 2, the outer diameter of the permeate flow line 30 is sufficiently smaller than the inner diameter of the housing outlet 19 to allow the concentrate to flow in the annular space between housing outlet 19 and the flow line 30.

As can be seen in FIG. 3, a leaf 32 is spirally wound around the permeate tube 28. The leaf 32 operates to separate the feed stream into concentrate and permeate streams. The leaf 32 comprises a permeate carrier layer sandwiched between two membrane layers, and spacers (not shown) which separate the layers of the wound leaf 32 to allow the feed stream to pass therethrough. Permeate flows along the permeate carrier in a spiral path to the tube 28, entering the permeate tube 28 through openings 31. The permeate then flows from the permeate tube 28 into the permeate flow line 30 and is removed from the filtration module 10 through permeate discharge line 16.

Turning again to FIGS. 1 and 2, a layer of tape 34 is wound around the cartridge 14 from end to end to prevent epoxy from wicking onto the membrane surface during the overwrap operation to be discussed below. Bypass seals 20 are then positioned onto the opposed ends of the cartridge 14, as by sliding or the like. The inner diameter of the sleeve 24 of each seal 20 is slightly smaller than the outer diameter of the cartridge 14 with the tape 34 wrapped therearound, whereby the seals 20 are retained securely in position by means of compression forces acting between the sleeves 24 and the cartridge 14. The cartridge 14 and the associated seals 20 are then encapsulated by an overwrap 36 typically comprising a combination of epoxy and glass fibers. This fiberglass/epoxy overwrap 36 prevents the leakage of feed material from the cartridge into the annular space between the outer diameter of the cartridge 14 and the inner diameter of the housing 12, which space is generally referred to as the bypass zone or bypass channel 38. The overwrap 36 also helps to retain the bypass seals 20 on the ends of the cartridge 14.

The cartridge 14 having the bypass seals 20 and the fiberglass/epoxy overwrap 36 positioned thereon is then loaded into the housing 14 by deforming or collapsing the flange gasket 22 of one of the seals 20 and sliding the cartridge 14 axially into place within the housing 12. Once the cartridge 14 is properly positioned within the housing 12, the flange 22 is returned to its original shape. In this manner, there is negligible insertion force on the seal 20, virtually eliminating the potential for seal damage during insertion. Endcaps 40 are then placed onto the ends of housing 12 and sandwich the flange 22 of each seal 20 between a housing flange 41 and the endcaps 40. Bolts 42 are inserted through openings (not shown) in the endcaps 40 and housing flanges 41 and the associated apertures 26 in the seals 20 and are secured by nuts 44. Upon tightening of nuts 44, the flange portion 22 of seal 20 functions as a gasket to provide a fluid-tight seal between the endcap 40 and housing flange 41. Notably, the flange 22 and sleeve 24 in each bypass seal 20 cooperate to block fluid from passing from the ends of the cartridge 14 into the bypass channel 38. The overwrap 36 likewise prevents passage of fluid from flowing from the outer surface of the cartridge 14 into the bypass channel 38. The bypass channel 38 is thus effectively sealed from the fluid flowing within filtration module 10.

In use, a liquid to be filtered is introduced as a feed stream into the filtration module 10 from a feed stream manifold 50 through housing inlet 18. The permeate plug 29 prevents unfiltered feed from entering permeate tube 28. As the feed travels through the filtration cartridge 14, the feed is divided into concentrate and permeate. The permeate is directed to the permeate tube 28 by the permeate carrier layer of the spirally wound leaf 32 surrounding the permeate tube 28. The permeate travels through the permeate flow line 30 and exits the cartridge 14 through permeate discharge line 16, where it is then directed to a permeate discharge manifold 52. The concentrate exits the cartridge 14 through the concentrate discharge line 17, and is then directed to a concentrate discharge manifold 54 for removal.

Because the bypass seals 20 of the present invention extend continuously from the endcaps 40 to the cartridge 14, there is no interaction between the feed stream and the housing 12 other than at the endcaps 40, and thus the feed stream is prevented from contacting the housing 12 or leaking into the bypass channel 38. Additionally, as the seals 20 are secured to the outer diameter of the cartridge, the feed stream is prevented from getting behind the seals 20 and possibly stagnating there, which potentially could lead to clogging or sanitation problems as discussed above. All of the feed stream is thus forced to flow through the cartridge 14 and results in increased and more stable filtering performance with less pumping energy.

Further, since the sealing effect does not depend on any moving or compressible parts, as is required by the brine seal or the brine seal of conventional design, the filtration module 10 incorporating the bypass seal assembly 20 of the present invention can be installed either vertically or horizontally, and additionally can be operated in both forward and reverse flow, all without compromising the integrity of the sealing effect.

Notably, because the seal 20 is positioned directly on the cartridge and never contacts the inner wall of the housing, there is no need for small housing tolerances between the cartridge and the inner wall of the associated housing.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention, what is claimed is:

1. A device for use in filtration of a liquid feed stream, the device comprising:

a housing including means for receiving the feed stream at one end thereof;

a filtration cartridge for separating the feed stream into concentrate and permeate, the cartridge being disposed within the housing in spaced relationship to the housing to accommodate the selective removal of the cartridge from the housing, the spaced relationship presenting an essentially annular space;

means for preventing the feed stream from entering the annular space between the cartridge and the housing, the prevention means including a pair of flexible seals positioned on opposed ends of the cartridge, each seal comprising a gasket and a sleeve extending perpendicularly therefrom;

means for encapsulating the cartridge and the seals positioned thereon;

means coupled with the housing for accommodating withdrawal of permeate; and means coupled with the housing for discharging the concentrate therefrom.

2. The device as set forth in claim 1, wherein the inner diameter of the sleeve is slightly smaller than the outer diameter of the cartridge, whereby the seals are adapted to be securely retained in position on the cartridge by means of compression.

3. A device for use in filtration of a liquid feed stream, said device comprising:

a housing including an inlet for receiving the feed stream at one end thereof;

a filtration cartridge for separating the feed stream into concentrate and permeate, the cartridge being disposed within the housing in spaced relationship to the housing, the spaced relationship presenting an essentially annular space;

a seal extending between the housing and cartridge for preventing the feed stream from entering the annular space between the cartridge and the housing and from contacting the housing, the seal comprising a gasket secured to the housing and a sleeve extending from the gasket and secured to the cartridge;

a first outlet coupled with the housing for accommodating withdrawal of permeate; and a second outlet coupled with the housing for discharging the concentrate therefrom, wherein the seal is positioned at an end of the filtration cartridge adjacent the inlet and wherein a second seal is positioned at an opposite end of the filtration cartridge, said second seal having a gasket secured to the housing and a sleeve secured to the cartridge, and wherein the sleeve of each seal is formed of resilient material and has an inner diameter slightly smaller than the outer diameter of the cartridge, to allow the seals to be retained in position on the cartridge by means of compression.

4. The device as set forth in claim 3, including means to encapsulate the cartridge and the sleeves of the associated seals.

5. A device for use in filtration of a liquid feed stream, the device comprising:

a housing including means for receiving the feed stream at one end thereof;

a filtration cartridge for separating the feed stream into concentrate and permeate, the cartridge being disposed within the housing in spaced relationship to the housing to accommodate the selective removal of the cartridge from the housing, the spaced relationship presenting an essentially annular space;

means for preventing the feed stream from entering the annular space between the cartridge and the housing, the prevention means including a flexible seal positioned on an end of the cartridge, said seal comprising a gasket and a sleeve extending essentially perpendicularly therefrom;

means for encapsulating the cartridge and the seal positioned thereon;

means coupled with the housing for accommodating withdrawal of permeate; and means coupled with the housing for discharging the concentrate therefrom.

6. The device as set forth in claim 5, wherein the inner diameter of the sleeve is slightly smaller than the outer diameter of the cartridge, whereby the seal is adapted to be securely retained in position on the cartridge by means of compression.

* * * * *